(12) United States Patent
Meacham (10) Patent No.: US 6,565,095 B2
(45) Date of Patent: May 20, 2003

(54) FACE SEAL WITH INTERNAL DRAIN

(75) Inventor: Walter L. Meacham, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 5 days.

(21) Appl. No.: 09/904,777

(22) Filed: Jul. 12, 2001

(65) Prior Publication Data

US 2003/0011135 A1 Jan. 16, 2003

(51) Int. Cl.[7] ................................................. F16J 15/34
(52) U.S. Cl. ........................................ 277/408; 277/411
(58) Field of Search ................................. 277/390, 391, 277/393, 385, 408, 514, 411, 413

(56) References Cited

U.S. PATENT DOCUMENTS

| | | | | |
|---|---|---|---|---|
| 1,798,158 A | * | 3/1931 | Hazard | 277/514 |
| 3,085,808 A | * | 4/1963 | Williams | 277/388 |
| 3,360,272 A | * | 12/1967 | Blom et al. | 277/348 |
| 3,506,276 A | * | 4/1970 | Peterson et al. | 277/364 |
| 3,746,349 A | * | 7/1973 | Smale et al. | 277/382 |
| 3,746,350 A | * | 7/1973 | Mayer et al. | 277/366 |
| 3,926,442 A | * | 12/1975 | Muller | 277/348 |
| 4,586,717 A | * | 5/1986 | Sweeney | 277/348 |
| 5,039,113 A | * | 8/1991 | Gardner | 277/348 |
| 5,149,249 A | * | 9/1992 | Schellong et al. | 277/369 |
| 5,158,431 A | * | 10/1992 | Schellong et al. | 277/369 |
| 5,174,584 A | * | 12/1992 | Lahrman | 277/400 |
| 5,412,977 A | * | 5/1995 | Schmohl et al. | 277/318 |
| 5,544,897 A | * | 8/1996 | Di Pietro et al. | 277/389 |

* cited by examiner

Primary Examiner—Anthony Knight
Assistant Examiner—Alison K Pickard
(74) Attorney, Agent, or Firm—Robert Desmond, Esq.

(57) ABSTRACT

A face seal assembly with internal weep drain is disclosed for use in a turbo-machine, such as a gas turbine engine, for deterring passage of fluids, such as oil and the like, across an interface dividing the turbo-machine into two distinct regions, the interface being defined between one surface of a seal element and a second surface mounted on a rotating shaft. The face seal assembly includes a housing having a first fixed member including a drain opening, a second member supported for axial motion relative to the first member, and a biasing element positioned between the first and second members for urging the second member toward the interface. The second member supports the seal element and defines with the first member a channel through which the fluids that migrate past the interface are directed into the housing and out through the drain opening. Various housing configurations and sealing arrangements are disclosed, all of which effectively control release of oil and smoke into the atmosphere without affecting the axial length or weight of the sealing system.

22 Claims, 6 Drawing Sheets

FACE SEAL WITH INTERNAL DRAIN

BACKGROUND OF THE INVENTION

The present invention relates to sealing arrangements for establishing sealing barriers for rotors extending from an oil-immersed region to an air-immersed region, and more particularly, to a face seal system which incorporates an oil weep drain, secondary seals, and buffer systems into a housing and is operative to shorten the "effective" length of the sealing system, thereby reducing rotor length and weight.

Air exhaust from turbo-machinery is often released into areas populated by people. Oil, which can leak into this air due to the high pressures, high temperatures, and/or high speeds, under which the turbo-machinery operates, results in an unpleasant smell and sometimes produces smoke to which the people are exposed. This has become a major cause of removal and/or excessive maintenance of propulsion engines and auxiliary power units (APUs).

The prior art is replete with sealing apparatus for minimizing passage of fluids across barriers. Some of the apparatus focus on using a multiplicity of seals (see U.S. Pat. No. 3,085,808 to Williams, U.S. Pat. No. 4,619,364 to Mitumaru, and U.S. Pat. No. 3,360,272 to Blom et al.), while others focus on maintaining pressure control (see U.S. Pat. No. 3,813,103 to Wiese, U.S. Pat. No. 3,926,442 to Muller, and U.S. Pat. No. 4,087,097 to Hossens et al.), but none incorporate provisions for controlling the axial length of the sealing system, nor is there any concern for the resulting weight increase due to the increased length of the turbo-machinery.

A more recent solution developed by the assignee of the present invention includes a system for oiled sumps which uses a carbon ring seal (primary air-to-oil seal), two oil "weep" drains, secondary air-to-oil seals, and a single air buffer system in conjunction with the stationary housing of the turbo-machinery. This arrangement has proven to be effective in significantly reducing, if not nearly eliminating, oil leakage. However, when used with a carbon face seal, the axial length of the improved system is increased an extensive and unacceptable amount with a corresponding increase in engine weight, and a negative impact on the dynamics of the rotor system.

Therefore, there exists a need for sealing apparatus using a face seal to keep lubricating oil on one side of turbo-machinery, such as a gas turbine engine, from passing to the air, or compressor, side of the turbo-machinery which will contribute to reduction of the effective overall axial length of the sealing system, achievement of a meaningful reduction of weight in the turbo-machinery, and also improvement of the system's dynamic characteristics.

SUMMARY OF THE INVENTION

In one aspect of the present invention, a sealing apparatus comprises a housing including a portion for retaining the face seal element and a biasing element for urging the face seal element into sealing engagement with a portion of the rotor of the turbo-machinery, and further comprises an axial extending leg portion which defines, with the portion for retaining the face seal element, a fluid flow path through the housing for removing oil which has breached the face seal element-rotor interface.

In another aspect of the invention, variations of the structure of the seal housing are disclosed which provide the same oil-air isolation function but which operate with potentially greater efficiencies.

Other aspects, advantages and features of the invention will become more apparent and better understood, as will equivalent structures, which are intended to be covered herein, with the teaching of the principles of the invention in connection with the disclosure of the preferred embodiments thereof in the specification, claims and drawings.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a face seal assembly of superior design and performance.

Generally, the sealing assembly of the present invention is located in a turbo-machine, such as a gas turbine engine, at the interface of rotating components and fixed stationary components to prevent oil used on the rotor support side of the engine, which is located in an oil bath cavity, from passing to the air side of the engine.

Figure 1:
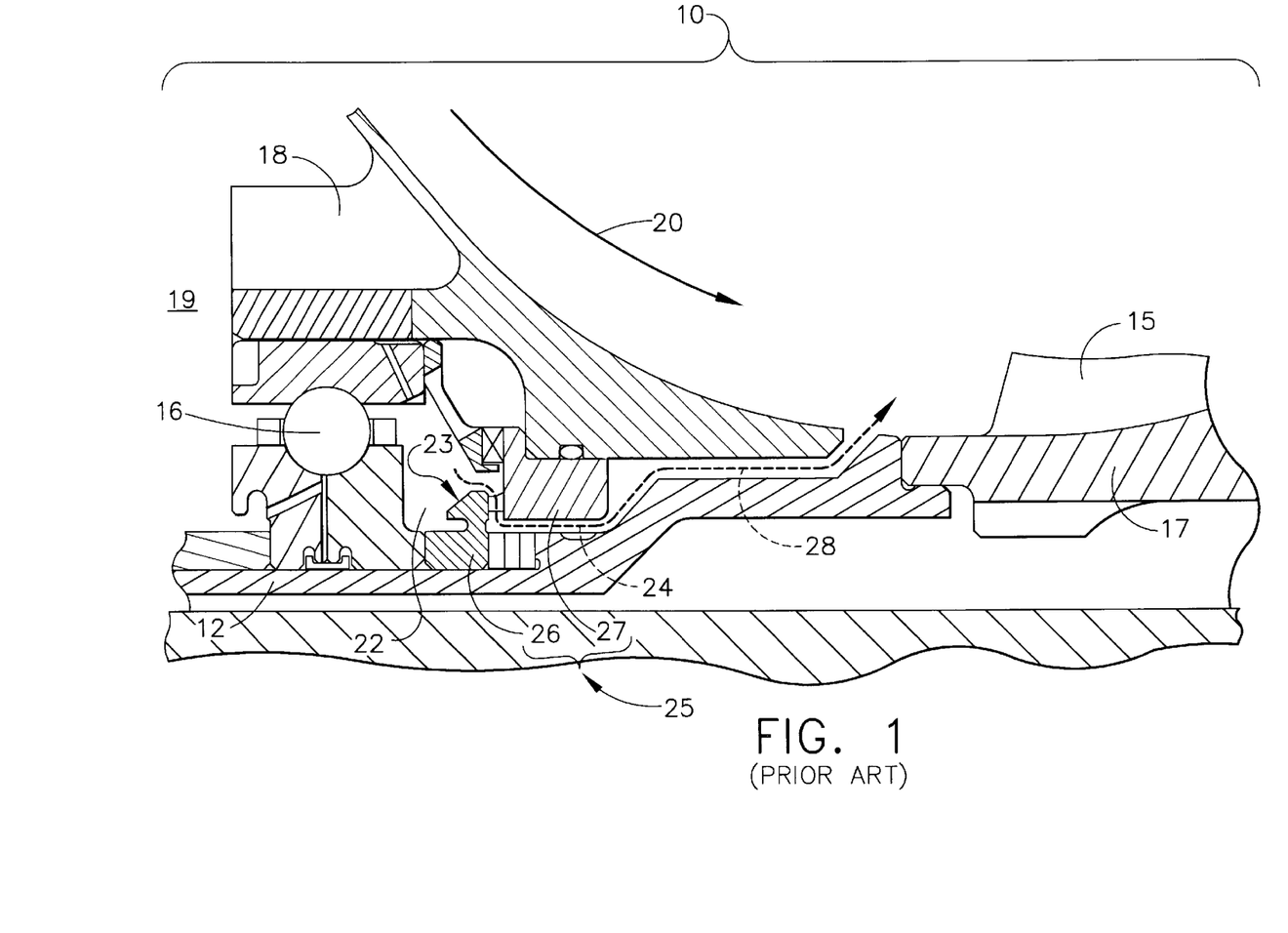
FIG. 1 shows a cross sectional view of a typical prior art face seal installation.
Figure 2:
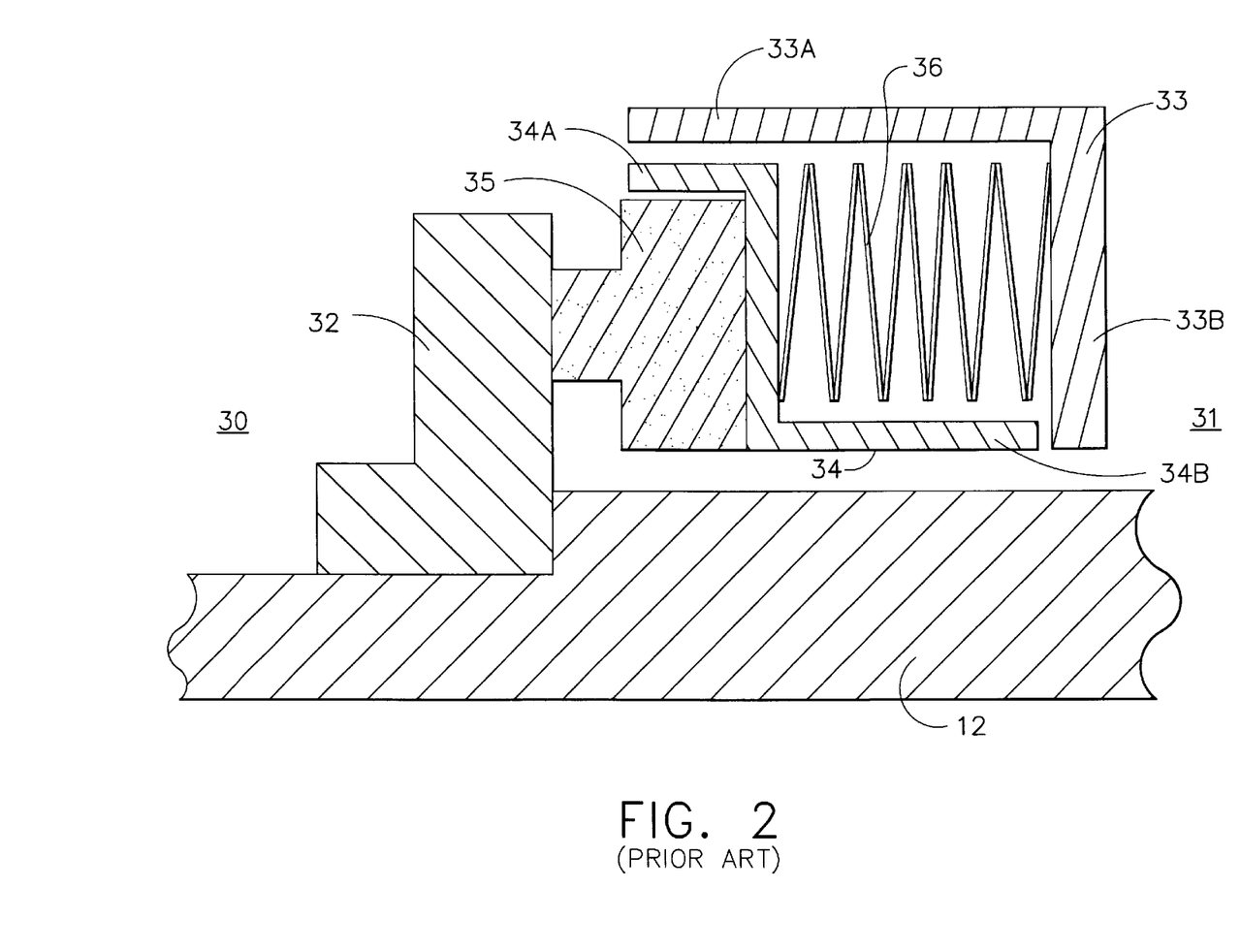
FIG. 2 is a schematic representation of a typical face seal assembly used in the installation of FIG. 1.
Figure 3:
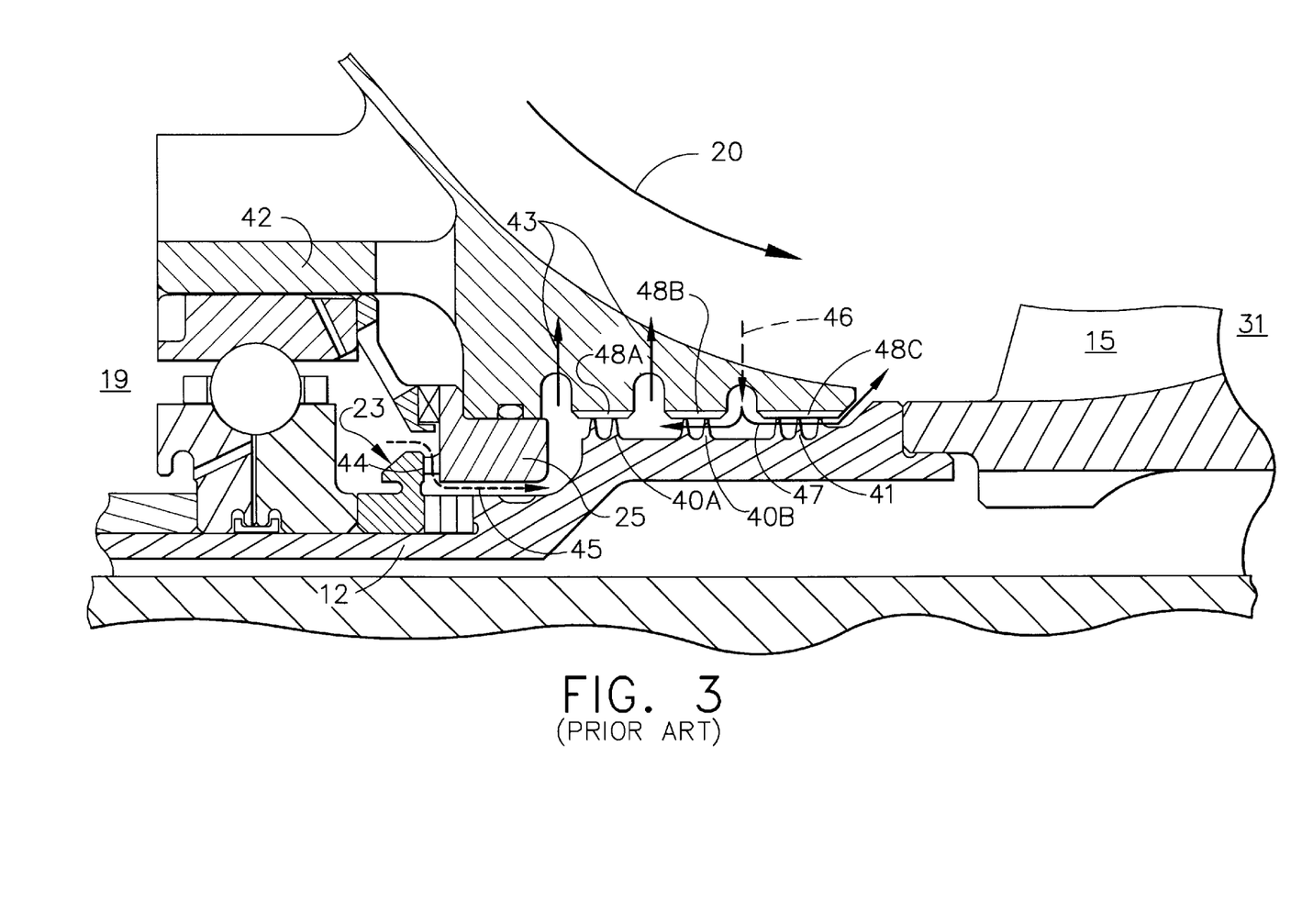
FIG. 3 shows a cross sectional view of a typical prior art face seal installation with oil weep drains and an air buffer systems to prevent migration of the oil that has leaked past the face seal into the air system.

Referring to the accompanying drawings in which like reference numerals indicate like parts throughout the several views, FIGS. 1 and 2 depict a sealing assembly used in a typical prior art turbo-machine installation 10, as exemplified by U.S. Pat. No. 3,813,103 to Wiese. FIG. 3 depict a sealing assembly using the face seal of Wiese with secondary seals to prevent fluid migration from one cavity to another, as exemplified by US Patent No. 4,619,354 to Mitumaru.

Referring more specifically to FIG. 1, there is shown a rotating shaft 12 having a compressor rotor 17 and compressor blades 15 mounted on one end thereof for rotation together with the shaft. An axial mechanical face seal assembly 25, comprised of a rotating part 26 and stationary part 27, is operatively positioned about the exterior of the shaft 12 and between the compressor rotor 17 mounted on shaft 12 and bearing 16 which rotatably supports shaft 12 within the casing. Other critical elements of the installation include the compressor air inlet (air cavity), illustrated by arrow 20, the oil sump drain 18 (which is the primary oil drain), and the oil sump 19, which serves to remove oil from the sump. The air to oil interface 23 of the face seal assembly 25, separates the oil side 22 from the air side 24. Arrow 28 illustrates the potential oil leak path into the compressor air inlet.

FIG. 2 is schematic representation of a typical face seal assembly used in the installation of FIG. 1. The face seal assembly comprises a housing 33 arranged radially outwardly of carbon retainer 34. Both the housing 33 and carbon retainer 34 are non-rotatably mounted to the casing of the turbo-machine. The housing 33 includes a cylindrical wall 33A and an axial wall 33B depending from the downstream 31 end of the housing 33. The carbon retainer 34 includes a first cylindrical wall 34A for supporting a carbon element 35 having an upstream 30 facing sealing surface, and a second cylindrical wall 34B disposed parallel to cylindrical wall 33A of the housing 33 and extending in a downstream 31 direction toward the axial wall 33B of the housing 33. The carbon retainer 34 is supported for axial motion relative to the housing 33. The carbon element 35 is supported by the first cylindrical wall 34A of the carbon retainer 34 in such a manner that the upstream 30 facing surface of the carbon element 35 is maintained in a substantially contiguous disposition with the downstream 31 facing surface of a seal runner 32 secured about and rotating with the shaft 12.

Disposed between the second cylindrical wall 34B and the housing 33 is bellows 36 which may take the form of an elastomeric body, a coil spring, or a series of bellow springs (the latter being shown in FIG. 2 for purposes of this description), which is secured to the housing 33 and is compressed axially between axial wall 33B and carbon retainer 34 in the position shown in FIG. 2. The biasing element is provided for axially urging the carbon retainer 34 in an upstream 30 direction to maintain contact between the upstream 30 facing surface of the carbon element 35 and the downstream 31 facing surface of the seal runner 32.

The desired sealing function of the invention is achieved by the interface of the mating surfaces of the seal runner 32 and the carbon element 35. When operative, the sealing assembly substantially eliminates the leakage of harmful or undesired fluids, such as oil, from one side of turbo-machinery, such as a pump chamber, into the chamber on the other side of the interface, such as the air inlet to a compressor. In the FIG. 2 depiction, the region to the left (i.e., the upstream 30 side) of the seal runner 32 constitutes the "oil-filled" side of the turbo-machine, while the region to the right (i.e., the downstream 31 side) of the seal runner 32 constitutes the "air-filled" or oil-cavity side of the turbo-machine. The interfaced carbon element 35 and seal runner 32 work to deter oil from migrating into the "air-filled" or air-cavity side of the apparatus. In the prior art application of U.S. Pat. No. 3,813,103, as shown in FIG. 1, arrow 28 illustrates how oil that migrated past seal runner 32 and carbon element 35 would enter the air-cavity.

FIG. 3 shows the approach taken in U.S. Pat. No. 4,619, 354 in order to capture oil that migrates past the primary air to oil seal 44 (seal runner 32 and carbon element 35 of FIG. 2) the air to oil interface 23 on the downstream 31, "air-filled" side of the turbo-machine is evacuated through one or more secondary oil drain 43 openings in the casing of the turbo-machine.

Still referring to FIG. 3, the face seal assembly 25 is typically positioned upstream from secondary seals, which are shown as labyrinth seals 40A and 40B, mounted on the rotating shaft 12, as well as secondary oil drain openings 43 and a single buffer air supply 46 formed in the stationary housing 42. Because no seal is fully capable of preventing leakage, especially where the components are operating under high speeds, high temperatures, and high pressures as would be the case in turbo-machines, the machinery is provided with secondary oil drains 43 (commonly known as weep drains to those skilled in the art) downstream of the face seal assembly 40. The single buffer air supply 46, which is pressurized air maintained at a higher pressure than the oil-cavity and the air-cavity pressures, is provided to assist in the evacuation of oil (through the secondary oil drains 43) which has leaked through the air to oil interface 23 (the potential oil leakage path is shown as arrow 45) to the downstream 31, or "air", side of the turbo-machine. The labyrinth seals 40A and 40B are positioned at strategically located placements on the rotating shaft 12 so as to be in facing relationship with labyrinth seal shrouds 48A, 48B and 48C carried by the machine casing so that secondary seals are formed therebetween.

The assemblage of elements shown in FIG. 3, representative of the prior art, is deficient and therefore undesirable because all of these elements mandate an increased axial length and a commensurate weight penalty. When compared to FIG. 1, however, the prior art approach shown in FIG. 3 does reduce the potential of oil migration from the oil-cavity into the air-cavity.

Figure 4:
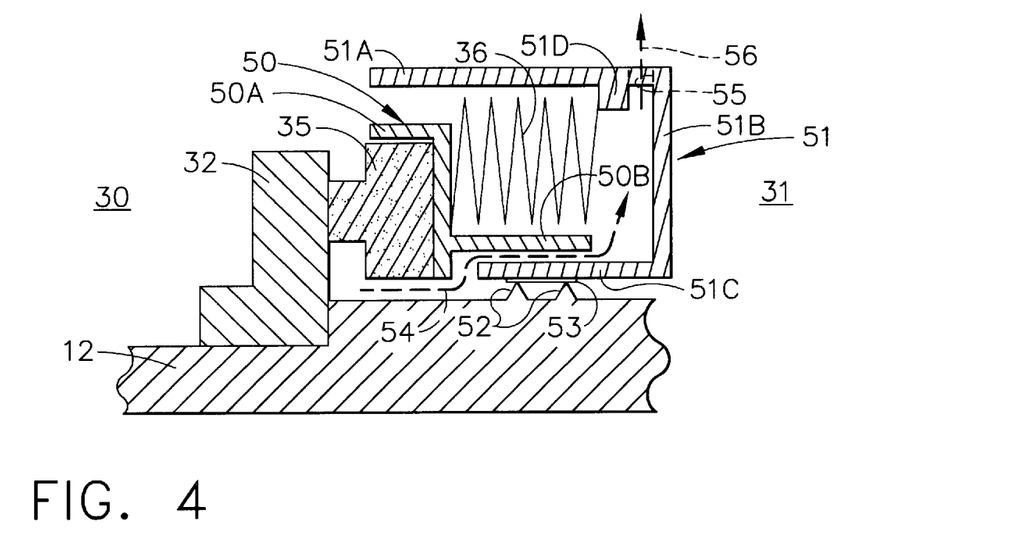
FIG. 4 is a schematic representation a first embodiment of the face seal assembly according to the present invention.

FIG. 4 schematically depicts a first embodiment of the face seal assembly of the present invention, which comprises a housing 51, a carbon retainer 50, a bellows 36, a seal runner 32, and a carbon element 35. The housing 51 includes an axially extending cylindrical wall 51A, an axial wall 51B depending radially inward from the downstream 31 end of cylindrical wall 51A, and a second cylindrical wall 51C extending in an axial upstream 30 direction from the radially inward end of axial wall 51B parallel to cylindrical wall 51A. An inwardly directed short axial leg 51D which depends from the cylindrical wall 51A and parallel to axial wall 51B is located upstream 31 of axial wall 51B a small distance therefrom. An oil drain hole 55 is provided in cylindrical wall 51A between axial leg 51D and axial wall 51B to provide an oil drain path 54 leading to a oil weep drain in the housing (such as the secondary oil drains 43 shown in FIG. 3).

The carbon retainer 50 includes a first cylindrical wall 50A for supporting carbon element 35 having an upstream 31 facing sealing surface, and a second cylindrical wall 50B disposed parallel to and extending in an axial direction between cylindrical wall 51A and the second cylindrical wall 51C. The second cylindrical wall 50B extends in a downstream 31 direction toward axial wall 51B. A biasing bellows 36 positioned between the upstream 30 side of axial leg 51D and the downstream 31 facing surface of the carbon retainer 50 urges first cylindrical wall 50A in an upstream 30 direction such that the upstream 30 face of carbon element 35 is pressed into sealing engagement with the downstream 31 face of the rotating seal runner 32.

The radially inner surface of the second cylindrical wall 51C carries a labyrinth seal shroud 53 arranged atop labyrinth seal 52 secured to the rotating shaft 12. The second cylindrical wall 50B of the carbon retainer 50 is radially spaced from the second cylindrical wall 51C of the housing 51 so that a oil drain path (indicated by the dotted line 54 running from below the carbon element 35 through the face seal housing) is formed between the two. The flow path runs from the radially innermost region of the seal housing just downstream 31 of the carbon element 35 to oil drain hole 55 in cylindrical wall 51A. Along with the labyrinth seals 52 which act to block the further migration of oil downstream, the oil drain path 54 allows oil which has migrated past the interface between carbon element 35 and seal runner 32 to be evacuated from the "air" side of the engine before entering any airstream being directed to the passenger compartment, or other occupied areas.

Figure 5:
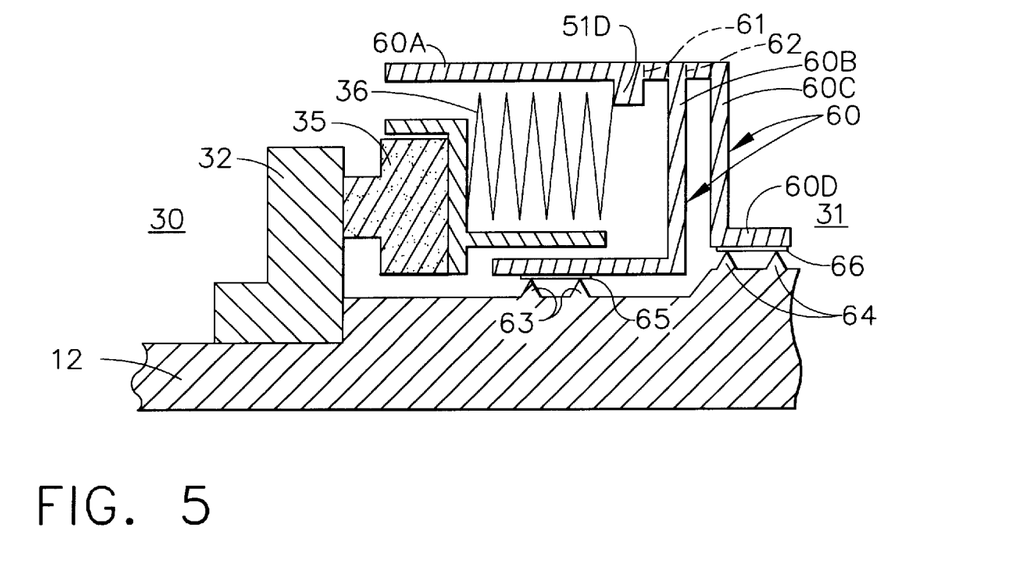
FIG. 5 is a schematic representation of a second embodiment of the face seal assembly according to the present invention.

FIG. 5 schematically depicts a second embodiment of the face seal assembly according to the present invention, which provides for redundant oil draining capability. In this embodiment, the housing 60 includes a first axial wall 60B and a second axial wall 60C spaced from and axially positioned downstream 31 of the first axial wall 60B. A second oil drain hole 62 is positioned on the housing 60 cylindrical wall 60A downstream 31 of the first oil drain hole 61. The radially inward end of the housing 60 second axial wall 60C has a downstream 31 extending cylindrical leg 60D which carries a second labyrinth seal shroud 66 in facing relationship to a second labyrinth seal 64 carried on the shaft 12 downstream 31 of the first labyrinth seal 63 and first labyrinth seal shroud 65.

Figure 6:
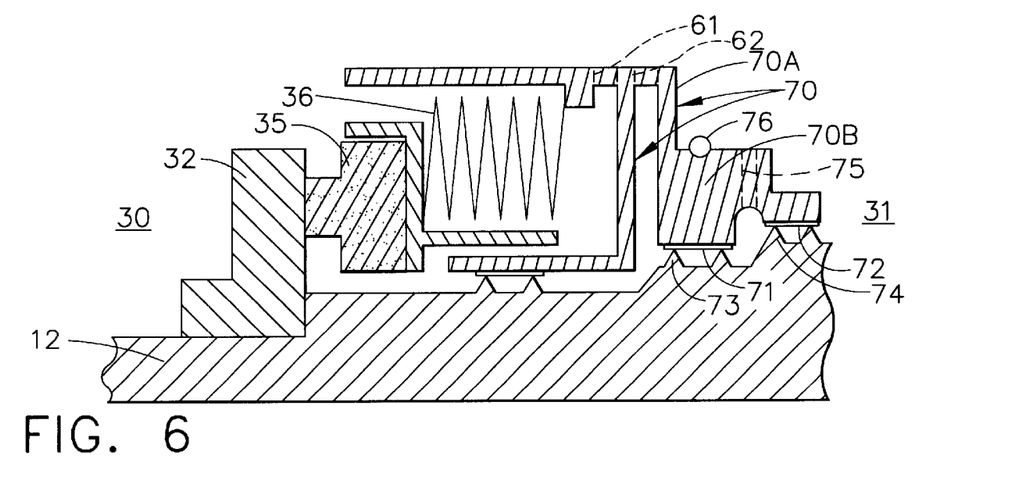
FIG. 6 is a schematic representation of a third embodiment of the face seal assembly according to the present invention.

FIG. 6 schematically depicts a third embodiment of the face seal assembly according to the present invention which provides not only the redundant oil draining capability as depicted in FIG. 5, but also includes an air buffer downstream of the oil drains. As shown, the housing's 70 second axial wall 70A is formed with an axially extending wall 70B having two sealing zones defined at the second labyrinth seal pad 71 and third labyrinth seal pad 72 disposed between the radially inward face of the axially extending wall 70B and a pair of strategically placed labyrinth seals 73 and 74 mounted to the rotating shaft 12. A channel 75 provided between the second labyrinth seal pad 71 and the third labyrinth seal pad 72 is operatively coupled to a source of pressurized gas, preferably compressed air, for increasing pressure on the downstream 31 side of the face seal assembly to force oil toward oil drain hole 61 and 62. An o-ring 76 provides a seal between axially extending wall 70B and the turbo-machine casing (not shown)

Figure 7:
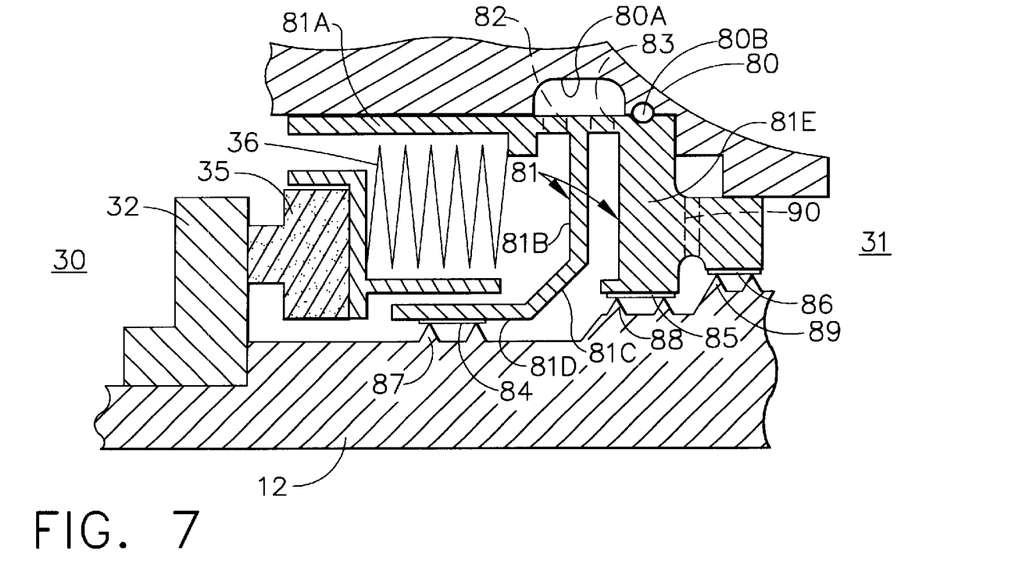
FIG. 7 is a schematic representation of a fourth embodiment of the face seal assembly according to the present invention.

FIG. 7 schematically depicts a fourth embodiment of the face seal assembly embraced by the present invention which is similar to the third embodiment shown in FIG. 6, but which differs in that the turbo-machine 80 casing is provided with a single cavity or sump 80A that communicates with oil drain holes 82 and 83 on the housing 81 first cylindrical wall 81A. The casing sump 80 is preferably operatively coupled with a vacuum source or other apparatus (not shown) communicating with a zone of lower pressure in order to encourage drainage of oil from within the face seal assembly. The housing 81 first axial wall 81B extends inwardly to an angular wall extension 81C and then in a upstream 30 direction forming a second cylindrical wall 81D, having a sealing zone defined at the first labyrinth seal pad 84 and a strategically placed first labyrinth seal 87 mounted on the rotating shaft 12. The axially extending wall 81E is spaced from and axially positioned downstream 31 of the first axial wall 81B, and has two sealing zones defined at the second labyrinth seal pad 85 and third labyrinth seal pad 86 disposed between the radially inward face of the axially extending wall 81E and a pair of strategically placed labyrinth seals 86 and 87 mounted to the rotating shaft 12. A channel 90 provided between the second labyrinth seal pad 85 and the third labyrinth seal pad 86 is operatively coupled to a source of pressurized gas, preferably compressed air, for increasing pressure on the downstream 31 side of the face seal assembly to force oil toward oil drain holes 82 and 83. An o-ring 80B provides a seal between axially extending wall 81E and the turbo-machine casing 80.

Figure 8:
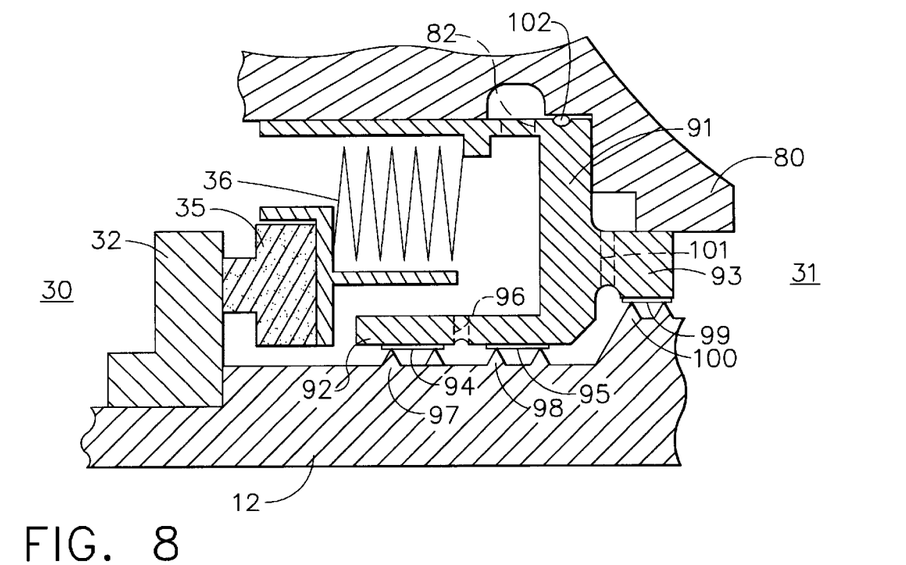
FIG. 8 is a schematic representation of a fifth embodiment of the face seal assembly according to the present invention.

FIG. 8 schematically depicts a fifth embodiment of the face seal assembly of the present invention in which the first and second axial legs 60B and 60C of the seal assembly second embodiment shown in FIG. 5 located downstream 31 of axial leg 51D, are merged into a large single axial element 91 bearing a first cylindrical wall 92 having an upstream 30 orientation and a second cylindrical wall 93 having a downstream 31 orientation. The first cylindrical wall 92 bears a pair of axially spaced apart labyrinth seal shrouds 94 and 95 disposed between a pair of strategically placed labyrinth seals 97 and 98 mounted to the rotating shaft 12, between which is an oil drain hole 96 for directing oil into the interior of the face seal assembly 98 that has migrated past the entrance of the primary flow path through the face seal assembly. The second cylindrical wall 93 bears, on a radially inward surface facing the rotating shaft 12, a third labyrinth seal shroud 99 for mating engagement with labyrinth seal 100 on the shaft. A channel 101 provided in the upstream 31 portion of the second cylindrical wall 93 is operatively coupled to a source of pressurized gas, preferably compressed air, for increasing pressure on the downstream 31 side of the face seal assembly to force oil toward oil drain holes 96 and 82. An o-ring 102 provides a seal between radial wall 91 and the turbo-machine casing 80.

Figure 9:
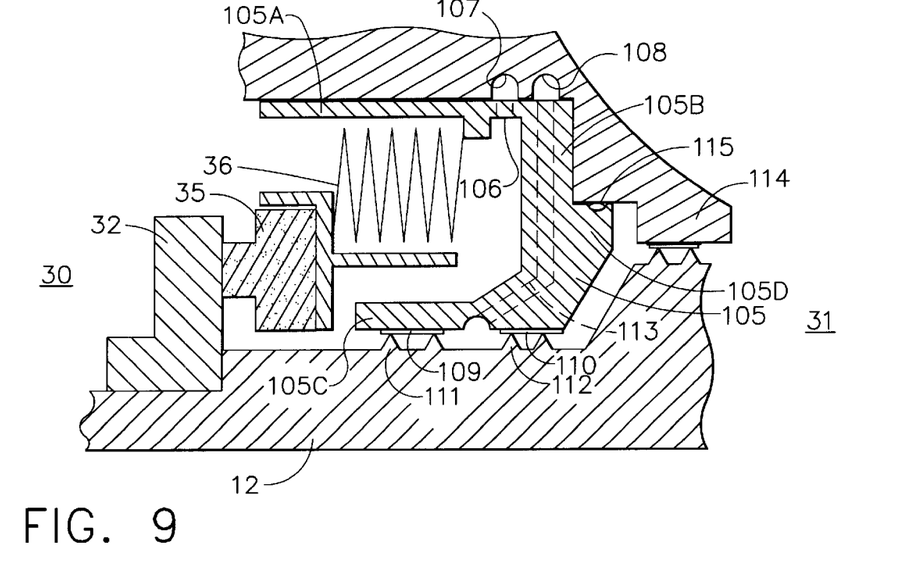
FIG. 9 is a schematic representation of a sixth embodiment of the face seal assembly according to the present invention.

FIG. 9 shows a sixth embodiment of the face seal assembly of the present invention in which the housing 105 comprises a first cylindrical wall 105A, a large axial wall 105B, and a second cylindrical wall 105C. The first cylindrical wall 105A includes a first oil drain hole 106 leading to a first sump 107, and comprises the primary oil flow path. The second cylindrical wall 105C bears a pair of axially spaced apart labyrinth seal shrouds 109 and 110 disposed between a pair of strategically placed labyrinth seals 111 and 112 mounted to the rotating shaft 12. Axial wall 105B includes a second oil drain hole 113 leading from the inner surface of second cylindrical wall 105C to the second sump 108, and comprises the secondary oil flow path. The first and second sumps 107 and 108 for the primary and secondary flow paths may be separate or they may constitute a single chamber, shown in FIG. 8. The downstream 31 portion of axial wall 105B has a shoulder 105D which engages the casing 114 of the turbo-machine, and which carries an o-ring 115 type seal.

Although the present invention has been described in considerable detail with reference to certain preferred versions thereof, other versions are possible. Therefore, the spirit and scope of the appended claims should not be limited to the description of the preferred versions contained therein.

I claim:
1. A face seal assembly for use in a turbo-machine for deterring passage of leaking fluids across an interface defined by dual regions between which fluids that leak are collected prior to passage into the opposite distinct region, the interface being defined between one surface of a seal element and a second surface mounted on a rotating component, the face seal assembly comprising:
   a housing having a first fixed member including a drain opening, and a second member supported for axial motion relative to the first member;

a biasing element positioned between the first and second members for urging said second member toward the interface, said second member supporting the seal element;

said first and second members of said housing having portions which define there between a channel through which fluids that migrate into the dual region interface are directed into the housing and out through the drain opening, prior to passage into the other distinct region wherein said first and second housing portions that define said channel are axially extensive and radially spaced apart from one another, further wherein said rotating component is mounted to a rotating shaft, and said channel-defining portion of said first member housing of said includes a pad on a radially inward surface for sealing engagement with sealing apparatus mounted on said shaft to define a discrete dual region sealing interface preventing fluid passage to the opposing region that the fluid is trying to migrate into.

2. The face seal assembly of claim 1, wherein said first fixed member of said housing comprises an upper axial portion, a lower axial portion, and a first radial portion interconnecting said upper and lower axial portions, and further wherein said drain opening is disposed in said upper axial portion adjacent to said first radial portion.

3. The face seal assembly of claim 2, and further including a radially inwardly directed leg extending from said upper axial portion toward said lower axial portion, said radial leg having a length which is substantially smaller than the length of said first radial portion, said biasing element being positioned between said housing second member and said leg.

4. The face seal assembly of claim 2, wherein said first member of said housing further includes a second radial portion located downstream of said first radial portion and disposed parallel to said first radial portion, and further wherein said first axial portion of said housing first member includes a downstream directed extension connecting said second radial portion with said first radial portion, said extension having a drain opening therein for draining fluid which has migrated downstream past the channel.

5. The face seal assembly of claim 4, and further including a second pad assembly on a radially inward portion of said second radial portion for engagement with second sealing apparatus mounted on said shaft to define a second discrete region for collection of fluid that has leaked past the primary discrete region of the sealing interface.

6. The face seal assembly of claim 5, wherein said second radial portion includes an axial leg having a downstream extent, and said second seal pad assembly is mounted on said axial leg.

7. The face seal assembly of claim 6, wherein said axial leg includes a third seal pad assembly mounted thereon downstream of said second seal pad assembly for mating engagement with third sealing apparatus mounted on said shaft.

8. The face seal assembly of claim 7, wherein said axial leg includes a radially extensive channel disposed between said second and third seal pad assemblies.

9. The face seal assembly of claim 4, wherein said drain openings disposed in said housing first member are fluidly connected.

10. The face seal assembly of claim 1, wherein said first fixed member includes first and second axial portions spaced radially from one another and a first radial portion joining said first and second axial portions, said drain opening being located in the radially outermost axial portion adjacent said radial portion.

11. The face seal assembly of claim 10, wherein said radial portion is disposed downstream of said drain opening, said radially outermost axial portion including a short radial segment located upstream of said drain opening which supports a downstream surface of said biasing element.

12. The face seal assembly of claim 11, wherein said housing second member includes a radial portion that engages an upstream portion of said biasing element as well as a downstream surface of said seal element.

13. The face seal assembly of claim 11, wherein said first fixed member further includes a second radial portion parallel to said first radial portion downstream of said first radial portion, and defining therebetween a second drain opening.

14. The face seal assembly of claim 13, wherein said second radial portion includes oppositely directed axial portions and a third drain opening operatively coupled with a low pressure chamber formed in the housing of the turbo-machinery.

15. A face seal assembly for use in a turbo-machine for deterring passage of fluids across an interface dividing the turbo-machine into two distinct regions, the interface being defined between one surface of a seal element and a second surface mounted on a rotating component, the face seal assembly comprising:

a housing having a first fixed member including a first axial segment including a drain opening, a second axial segment spaced radially from said first axial segment, and a radial segment connecting said first and second axial segments, and a second member supported for axial motion relative to the first member, said second member having at least one axial segment disposed between said first and second axial segments of said first member, a biasing element positioned between and engaging facing surfaces of the first and second members for urging said second member toward the interface, said second member supporting the seal element; and said axial segments of said first and second members of said housing having portions which define there between a channel through which fluids that migrate past the interface are directed into the housing and out through the drain opening wherein said first and second housing portions that define said channel are axially extensive and radially spaced apart from one another and wherein said rotating component is mounted to a rotating shaft, and said channel-defining portion of said first housing includes a seal pad on a radially inward surface for sealing engagement with sealing apparatus mounted on said shaft.

16. The face seal assembly of claim 15, wherein said drain opening is disposed in said first axial segment adjacent to said first radial segment.

17. The face seal assembly of claim 16, and further including a radially inwardly directed leg extending from said first axial segment toward said second axial segment, said radial leg having a length which is substantially smaller than the length of said first radial segment, said biasing element being captured between said housing second member and said leg.

18. A method of deterring migration of fluids downstream of a sealing interface formed between a rotating component and a component secured to the casing of a turbo-machine, the secured component including a first housing member supporting a seal element, and the rotating component including a sealing surface against which the seal element is seated, said method comprising the steps of:

providing a second housing member arranged radially inwardly of said first housing member, supporting said second housing member for axial movement relative to said interface, the first housing and second housing members comprising a seal assembly, forming a drain opening in said first housing member to allow fluids in said seal assembly to be evacuated therefrom, positioning a biasing member between a downstream side of said second housing member and said first housing member to urge said seal element in an upstream direction against said sealing interface, and arranging portions of said first and second housing members adjacent one another in such a way as to form a channel there between, said channel directing fluids, which have migrated past the sealing interface, into the seal assembly and out through the drain opening in the first housing member, and wherein the rotating component is secured to a rotating shaft, and further comprising the step of providing the first housing member with an axial portion disposed adjacent to the rotating shaft, and providing a sealing element on a surface of said axial portion facing said rotating shaft.

19. The method of claim 18, and further comprising the step of coupling said drain opening to a sump.

20. A method of deterring migration of fluids downstream of a sealing interface formed between a rotating component and a component secured to the casing of a turbo-machine, the secured component including a first housing member supporting a seal element, and the rotating component including a sealing surface against which the seal element is seated, said method comprising the steps of:

providing a second housing member arranged radially inwardly of said first housing member, supporting said second housing member for axial movement relative to said interface, the first housing and second housing members comprising a seal assembly, forming a drain opening in said first housing member to allow fluids in said seal assembly to be evacuated therefrom, positioning a biasing member between a downstream side of said second housing member and said first housing member to urge said seal element in an upstream direction against said sealing interface, and arranging portions of said first and second housing members adjacent one another in such a way as to form a channel there between, said channel directing fluids, which have migrated past the sealing interface, into the seal assembly and out through the drain opening in the first housing member wherein the rotating component is secured to a rotating shaft, and further comprising the step of providing the first housing member with a plurality of axial portions disposed adjacent to the rotating shaft and providing a sealing element on the surface of each axial portion facing the rotating shaft.

21. The method of claim 20, and further comprising the step of providing said first housing member with at least one radial portion for attaching said axial portions thereto, and further providing one pair of said axial portions supported by a radial portion with a channel therebetween for preventing fluids which migrate past the first channel from moving further downstream.

22. Apparatus for use in a turbo-machine for deterring passage of leaking fluids across an interface defined by dual regions between which fluids that leak are collected prior to passage into the opposite distinct region the interface begin defined between one surface of a seal element and a second surface mounted on a rotating component, which comprises:

a housing having a first fixed member including a drain opening, and a second member supported for axial motion relative to the first-member;

a biasing element positioned between the first and second members for urging said second member toward the interface, said second member supporting the seal element;

said first and second members of said housing having portions which define there between a channel through which fluids that migrate into the dual region interface are directed into the housing and out through the drain opening, prior to passage into the other distinct region and further wherein a portion of said housing first fixed member includes a downstream directed extension, said extension having a second drain opening therein for draining fluid which has migrated downstream past the channel.

\* \* \* \* \*